United States Patent [19]

Behn et al.

[11] Patent Number: 4,988,790
[45] Date of Patent: Jan. 29, 1991

[54] SUBSTANCES FOR THE MANUFACTURE OF PAPER

[75] Inventors: Rudolf Behn; Branislav Böhmer; Lutz Hoppe; Klaus Szablikowski, all of Walsrode, Fed. Rep. of Germany

[73] Assignee: Wolff Walsrode AG, Walsrode, Fed. Rep. of Germany

[21] Appl. No.: 149,470

[22] Filed: Jan. 28, 1988

[30] Foreign Application Priority Data

Feb. 11, 1987 [DE] Fed. Rep. of Germany ....... 3704173

[51] Int. Cl.$^5$ ................................................ C08J 00/00
[52] U.S. Cl. ................................... 524/514; 524/515; 525/183
[58] Field of Search .................. 525/183; 162/164.6

[56] References Cited

U.S. PATENT DOCUMENTS

| | | | |
|---|---|---|---|
| 3,976,824 | 8/1976 | Ariyoshi et al. | 525/359.2 |
| 3,988,503 | 10/1976 | Ariyoshi et al. | 525/359.2 |
| 4,052,259 | 10/1977 | Hoppe et al. | 162/164.3 |
| 4,093,605 | 6/1978 | Hoppe et al. | 525/430 |
| 4,234,378 | 11/1980 | Iwasaki et al. | 162/164.3 |
| 4,250,299 | 2/1981 | Lehmann et al. | 525/435 |
| 4,424,238 | 1/1984 | Degen et al. | 162/164.3 |
| 4,624,890 | 11/1986 | Lloyd et al. | 428/248 |
| 4,689,374 | 8/1987 | Hansson et al. | 525/423 |

FOREIGN PATENT DOCUMENTS 2552014  5/1977  Fed. Rep. of Germany .
1561727  11/1976  United Kingdom .

*Primary Examiner*—Allan M. Lieberman
*Attorney, Agent, or Firm*—Sprung Horn Kramer & Woods

[57] ABSTRACT

Substances suitable for use as retention agents contain a cationic polyacrylamide with recurrent dialkylaminoalkylacrylamide units and a polyamidamine or a polyamine.

16 Claims, No Drawings

SUBSTANCES FOR THE MANUFACTURE OF PAPER

The present invention relates to new substances for increasing the retention of fibers, fillers and pigments and for accelerating the process of dewatering in the manufacture of paper and as flocculating agents for working up the effluent from paper manufacture.

Addition and condensation products based on polyethyleneimine. polyamine, polyamidamine and their modifications with aminic starting products containing grafted ethyleneimine and cross-linking units are described, for example, in DE-AS 1 546 290, DE-AS 1 802 435, US-P 3 575 797, DE-OS 2 162 567, DE-AS 2 127 082, DE-OS 2 255 586, DE-OS 2 244 513, DE-OS 2 434 816, DE-OS 2 515 760, DE-OS 2 436 386, DE-PS 1 771 814, FR-P 2 094 645. DE-PS 2 353 430, DE-PS 2 502 874, DE-PS 2 538 745, EP-P 0 000 714, EP-P 0 033 104, EP-PS 0 025 515. EP-P 0 002 474, EP-PS 0 074 558, DE-OS 3 137 040. DE-OS 3 413 567 and DE-OS 3 421 557.

Although the condensation products described in the above-mentioned prior publications are said to provide good to very good acceleration of dewatering and a marked improvement in the retention of fillers, pigments and fine fibers and at the same time to reduce the load in the water circulation and in the effluent produced in paper manufacture the results obtained in practice indicate weaknesses in these products as regards retention.

In many paper manufacturing processes it is attempted to overcome this lack of retention by using products from a different class of substances.

Thus, for example DE-A 3 027 126 DE-A 3 529 585 EP-A-0 068 225 and EP-A-0 176 757 disclose cationic polyacrylamides which are used for paper manufacture especially when the retention of fine fibers, fillers and/or pigments is essential. These substances are generally known as flocculating agents. Owing to their high molecular weights, they frequently give rise to a troublesome retention of an excessive amount of fillers and fine substances in the manufacture of paper. This results in insufficient opacity and excessive cloudiness (transparency), impairment in sheet formation and often insufficient strength of the resulting paper sheet. Cationic polyacrylamides are predominantly used in the form of powders or emulsions. A few cationic polyacrylamides are also obtainable as dilute solutions.

One disadvantage for practical use of cationic polyacrylamide products used in the form of powders or emulsions is the technically elaborate procedure required when such products are to be added in controllable amounts to the paper pulp.

US-A 3 323 979, EP-A 0 155 503, DE A 2 098 664, DE-A 2 054 523 and DE-A 2 156 858 disclose cationic poly acrylamide products in the form of solutions which are prepared from polyacrylamides, e.g. by the known Mannich base reaction, and used in the paper industry. With these known means it is also difficult to obtain the required increase in the rate of dewatering combined with retention under specific conditions in the manufacture of paper.

Some improvement is obtained by the so-called dual systems. These systems, which are not only described in the literature, e.g. in "Das Papier", 32 (1978), No. 10 A, from page V 25 but also employed in practice, are based on two products which have different and opposite ionic charges. Non-ionogenic, predominantly anion-active high molecular weight polyacrylamides are used with cation-active polyethylene amines or polyaminoamides.

The use of two different products entails some complication in storage, handling preparation and dosing in the paper machine. Dosing of the two products must be accurately adjusted to one another for the manufacture of paper. Both overdosing and underdosing must be avoided in order to ensure that premature neutralisation of charges even before sheet formation will not occur as a result of the different ionic charges of the said products, as this would reduce the effectiveness.

In addition, the above-mentioned products must be added separately to the paper pulp since a combination of the two products would result in unstable solutions. After the cation-active and anion-active products have been mixed, the incompatibility and equalization of charges lead to phase separation, cloudiness, precipitation or gel formation, which prevent the two substances being used together.

The use of cationic polyacrylamides and cationic polyethyleneimines and/or polyamino amides could be considered as an alternative to the dual systems. This combination of products, however, has been described as comparatively ineffective in the trade literature, e.g. in "Wochenblatt für Papierfabrikation" 11/12 (1977) from page 397 and has therefore not been recommended.

Water-in-oil dispersions containing cationic copolymers of acrylamide and esters of acrylic acid and amino alcohols and polyalkyleneimines, alkyleneimine-epichlorohydrin resins, polyamidamines and reaction products of alkyleneimines and aminopolyamides are described in DE-A 2 552 014 and used for the manufacture of paper.

It was an object of the present invention to ensure increased and above all controllable retention combined with efficient dewatering in the manufacture of paper.

It was a further object of this invention to provide a substance which is simple to handle (without great technical complications).

It was a further object of this invention to provide a product which would form a stable aqueous solution and would therefore not charge the water circulation of a paper factory with additional substances such as emulsifying agents hydrocarbon compounds, formaldehyde or unbound amines.

An agent for the manufacture of paper has now been found containing a cationic polyacrylamide C) and at least one other polymer. According to the invention, this agent contains, based on the polymer content, (A) at least one polyamidamine, preferably from 25 to 90% by weight thereof, especially from 50 to 90% by weight, and/or (B) at least one polyamine, in particular polyethyleneimine, preferably from 25 to 90% by weight thereof, especially from 50 to 90% by weight, and (C) at least one cationic polyacrylamide, preferably from 10 to 75% by weight thereof, in particular from 10 to 50% by weight, containing recurrent dimethylaminopropylacrylamide units which may be quaternized, from 40 to 98% by weight, especially from 70 to 95% by weight of acrylamide units and from 2 to 60% by weight, especially from 5 to 30% by weight of dimethylaminopropylacrylamide units being preferred.

The cationic polyacrylamide (C) may optionally contain other recurrent units in addition, in particular cationic acrylamide esters, which are optionally quaternized.

In a particularly preferred embodiment, the agent consists of the polymers mentioned above so that the percentages add up to 100%.

The agent according to the invention is preferably used in a water-soluble form

Polyamidamides for the purpose of the present invention are preferably compounds which are obtained by cross-linking of polycondensates. The polycondensates contain amide and amino groups and are obtained from polyalkylene polyamines, aliphatic dicarboxylic acids and optionally also caprolactam. The usual polyfunctional compounds may be used for cross linking e g. epichlorohydrin and dichloroethane.

The polycondensates may be modified with reaction products of epichlorohydrin and trimethylamine (DE-PS 2 353 430), epichlorohydrin, dimethylamine and polyalkylene polyamine (DE-PS 2 502 874) and ethyleneimine (DE-AS 1 802 435) before they are cross-linked This group of products also includes polyamidamines which are modified with ethyleneimine and are cross-linked with a reaction product of ethylene glycol ether and epihalogenhydrin (DE-AS 2 434 816).

Particularly preferred polyamidamines are, for example, the polyethylene glycol-polyaminoamide condensation products known from EP-A-0 000 714.

The polyamines are preferably compounds obtained by the reaction of polyalkylene polyamines, which may be quaternized (EP-PS 0 005 241) with compounds which are bifunctional in their reaction with amines (DE-OS 2 244 513, GB-P 775 721, EP-P 0 003 499) while the amine function is preserved.

Particularly preferred polyamines may be prepared according to DE-A-2 351 754, DE-A-2 802 487 and DE-A-2 833 654.

The polyamines are preferably free from amide groups

In another very particularly preferred embodiment, at least one of the compounds mentioned under (A) or (B) is cross-linked with a polyfunctional cross-linking agent Particularly preferred cross-linking agents of this type are known as dihalogenalkyls, e.g. dichloroethane, glycidyl compounds, e.g. diglycidylphthalate, and halogen alkyl epoxides, e.g. epichlorohydrin.

In a preferred embodiment, the proportion of polymers indicated under (A) to (C) based on the total quantity of agent amounts to at least 1% by weight, preferably from 1 to 25% by weight in particular from 1 to 15% by weight.

The agent according to this invention is preferably an aqueous solution.

In a preferred embodiment, the agent according to the invention is an aqueous, homogeneous polymer solution which is stable in storage and has a viscosity at 20° C. of from 300 to 10,000 mPa.s and a pH of from 4 to 9.

The present invention further relates to the use of the new agents for increasing the retention of fillers, pigments and fibers and for accelerating dewatering in the manufacture of paper and as flocculating agent for working up the effluent from paper manufacture by sedimentation, floatation and filtration.

The following are particularly preferred polyamidamines and polyamines:

A1 according to Example 1 of EP P 0 000 714 (=US-P 4 267 059)
A2 according to Example 1 of DE-PS 2 353 430 (=US-P 4 052 259)
A3 according to Example 1 of DE-PS 2 502 874 (=US-P 4 093 605)
A4 according to Example 2 of DE-AS 2 434 816
A5 according to Example IIa of DE-A-2 802 487
A6 polyamine 1 according to EP-A 2474

The products according to the invention are preferably prepared by adding an aqueous solution of the compounds mentioned under A and/or B to an aqueous solution of the cationic acrylamide mentioned under C. This "homogenization" phase may be assisted by the effect of temperature and shearing aggregates. The homogenization phase may be influenced by the rate of addition of products A and/or B. The pH of the solution is then adjusted with an inorganic or organic acid and should be in the region of 4 to 9, preferably 5 to 7.

If the bifunctional cross-linking agent has not yet undergone complete reaction in products A and/or B, a reaction between A and/or B and C may take place by way of this cross-linking agent.

The new surprisingly homogeneous product, which has excellent stability, completely unexpectedly provides distinctly improved values for retention and dewatering especially when used in the manufacture of paper containing a high proportion of recycling raw materials and/or fillers (such as kaolin or calcium carbonate).

EXAMPLE 1

4020 g of water are introduced into a heatable container equipped with a propeller stirrer and the water is heated to 40° C.

100 g of a cationic polyacrylamide granules C containing 10% by weight of dimethylaminopropylamide are introduced uniformly at a measured rate into the water by way of a dry goods dosing device and stirred until completely dissolved.

880 g of a 25% by weight polyamidamine solution A according to Example 1 of EP-P 0 00 714 are continuously introduced into this polyacrylamide solution over a period of about 30 minutes and the mixture is then homogenized with continued stirring for one hour. The pH of the resulting polymer solution is adjusted to 6.4 with concentrated formic acid and cooled to room temperature with constant stirring. The end product has a viscosity of 3200 mPa.s (Rotovisko Haake, 20° C., $D=2.55 \sec^{-1}$).

The resulting cationic polymer solution according to the invention remains homogeneous and stable in storage even after 12 weeks (no increase in viscosity, no phase formation, no precipitation).

EXAMPLES 2 to 16

The procedure is the same as in Example 1, using the substances indicated in Table 1 in the quantities stated there. In Example 6, the dimethylaminopropylacrylamide put into the process had been quaternized with chloromethyl (proportion of cationic compounds: 25 parts by weight). The method of preparation is analogous to that of Example 1.

In Table 2, the viscosities are entered as a measure of the stability in storage, phase/gel formation is entered as a measure of he incompatibility and the homogeneity of the solution is entered as a measure of the compatibility of the cationic polymer solutions according to Examples 1 to 13.

The examples of practical application given below serve to illustrate the improved flocculation and retention effect together with efficient acceleration of dewatering of the cationic polymer solutions prepared according to the invention compared with known products.

The concentrations of the polymer solutions used in the examples of practical applications are shown in Table 3.

TABLE 1

Composition and conditions for preparation of the cationic polymer solutions

| Ex. | Polyacrylamide according to the application or trade product | Proportion of cationic monomers (% by weight) | Quantity of polyamide granulate used (g) | Quantity of water (g) | Polyamidamine/polyamine No. | Polyamidamine/polyamine Quantity (g) | Dissolving and homogenization temperature for preparation (°C.) | Viscosity (mPa.s) | pH |
|---|---|---|---|---|---|---|---|---|---|
| 1 | P 35 44 909.8 | 10 | 100 | 4020 | A1 | 880 | 40 | 3200 | 6.4 |
| 2 | P 35 44 909.8 | 10 | 100 | 3230 | A1 | 1670 | 30 | 3500 | 5.9 |
| 3 | P 35 44 909.8 | 45 | 100 | 3230 | A1 | 1670 | 20 | 874 | 6.3 |
| 4 | P 35 44 909.8 | 5 | 100 | 4020 | A1 | 880 | 30 | 3150 | 6.5 |
| 5 | P 35 44 909.8 | 15 | 100 | 3230 | A1 | 1670 | 25 | 2849 | 6.3 |
| 6 | P 35 44 909.8 | 25 | 100 | 4020 | A1 | 880 | 30 | 1112 | 6.6 |
| 7 | P 35 44 909.8 | 10 | 100 | 4020 | A2 | 880 | 30 | 3076 | 5.8 |
| 8 | P 35 44 909.8 | 10 | 100 | 4020 | A3 | 880 | 30 | 3237 | 6.2 |
| 9 | P 35 44 909.8 | 10 | 100 | 3230 | A4 | 1670 | 30 | 3312 | 6.4 |
| 10 | P 35 44 909.8 | 10 | 100 | 3230 | A5 | 1670 | 30 | 3294 | 6.2 |
| 11 | P 35 44 909.8 | 10 | 100 | 3230 | A6 | 1670 | 30 | 3391 | 6.3 |
| 13 | Praestol 322K ® | | 100 | 4020 | A1 | 880 | 30 | 407 | 6.2 |
| 14 | Praestol 333K ® | | 100 | 3230 | A1 | 1670 | 30 | 487 | 6.3 |
| 15 | Sursolan K 12 L ® | | 330 g of a 3% solution were used | | A1 | 1670 | 30 | 190 | 6.4 |
| 16 | Separan CP 35 ® | | 3330 g of a 3% solution were used | | A1 | 1670 | 30 | 1300 | 6.5 |

Praestol ® = Registered Trade Mark of Stockhausen
Sursolan ® = Registered Trade Mark of BASF
Separan ® = Registered Trade Mark of Dow Chem.

TABLE 2

Storage stability and compatibility of the cationic polymer solutions

| Ex. | After 1 week's storage (20° C.) Appearance and Condition | Viscosity | After 12 weeks' storage (20° C.) Appearance and Condition | Viscosity |
|---|---|---|---|---|
| 1 | Almost colourless and homogeneous solution (no phase formation) | 3200 | Almost colourless and homogeneous solution (no phase formation) | 3109 |
| 2 | Almost colourless and homogeneous solution (no phase formation) | 3495 | Almost colourless and homogeneous solution (no phase formation) | 3410 |
| 3 | Almost colourless and homogeneous solution (no phase formation) | 869 | Almost colourless and homogeneous solution (no phase formation) | 831 |
| 4 | Almost colourless and homogeneous solution (no phase formation) | 3145 | Almost colourless and homogeneous solution (no phase formation) | 3028 |
| 5 | Almost colourless and homogeneous solution (no phase formation) | 2841 | Almost colourless and homogeneous solution (no phase formation) | 2831 |
| 6 | Almost colourless and homogeneous solution (no phase formation) | 1098 | Almost colourless and homogeneous solution (no phase formation) | 1040 |
| 7 | Almost colourless and homogeneous solution (no phase formation) | 3078 | Almost colourless and homogeneous solution (no phase formation) | 3001 |
| 8 | Almost colourless and homogeneous solution (no phase formation) | 3212 | Almost colourless and homogeneous solution (no phase formation) | 3129 |
| 9 | Almost colourless and homogeneous solution (no phase formation) | 3304 | Almost colourless and homogeneous solution (no phase formation) | 3208 |
| 10 | Light brown and homogeneous solution | 3284 | Light brown and homogeneous solution | 3146 |
| 11 | Brown and homogeneous solution | 3375 | Brown and homogeneous solution | 3258 |
| 13 | Sediment and phase formation | not measurable | Sediment and phase formation | not measurable |
| 14 | Sediment and phase formation | not measurable | Sediment and phase formation | not measurable |
| 15 | Sediment and phase formation | not measurable | Sediment and phase formation | not measurable |
| 16 | Gel formation | not | Gel formation | not |

TABLE 2-continued

| | Storage stability and compatibility of the cationic polymer solutions | | | |
|---|---|---|---|---|
| | After 1 week's storage (20° C.) | | After 12 weeks' storage (20° C.) | |
| Ex. | Appearance and Condition | Viscosity | Appearance and Condition | Viscosity |
| | measurable | | measurable | |

DETERMINATION OF THE FLOCCULATION EFFECT

Kaolin (W. Prim, Bielefeld Type 23/163), which is well known to the man skilled in the art as filler for the manufacture of paper, was made up into a suspension in water and used to determine the flocculation effect of the products prepared in Examples 1 to 12 according to the invention and the Trade products used in the Comparison Examples (see Table 3). This kaolin suspension was used because it is close in its properties to a pulp/effluent suspension.

The kaolin suspension was prepared by shaking 15 g of kaolin per liter of water in a shaking cylinder having a capacity of 500 ml and an internal diameter of 45 mm and adjusting the pH to 6.5 with hydrochloric acid. 0.1% By weight and 0.2% by weight, respectively (based on the kaolin solids content) of the various solutions of retention agent were added to this suspension. The cylinder was shaken 6 times and the height to which the flocculated kaolin had settled in the measuring cylinder after a sedimentation or flocculation time of 1 minute was read off in ml.

The lower the height in ml to which the flocculated kaolin settles and the clearer the zone of water above the kaolin, the more effective is the flocculating agent.

The degree of turbidity of the zone of water above the flocculated component was therefore assessed after 2 minutes' rest in terms of cloudy, slightly cloudy and clear.

The following retention agents were used in the comparison example.

| Comparison Example | Composition |
|---|---|
| V0 | no retention agent |
| V1 | according to Example 1 of DE-PS 2 353 430 |
| V2 | according to Example 1 of DE-PS 2 502 874 |
| V3 | according to Example 1 of EP-PS 0 000 714 |
| V4 | according to Example 2 of DE-AS 2 434 816 |
| V5 | according to Example IIa of DE-A 2 802 487 |
| V6 | according to Polyamine 1 of EP-A-2 474 |

TABLE 3

Determination of the flocculation properties of an aqueous suspension of solids (15 g of kaolin/l of water)

| Example | Concentration of polymer solutions and of comparison products (% by weight) | Flocculation height of kaolin after 1 min. sedimentation time in (ml) when the following quantities of retention agent are added | | Visual assessment of the clear zone of water above the flocculated kaolin after 2 min. sedimentation time (The figures denote quantity of retention agent added in % by weight) | | |
|---|---|---|---|---|---|---|
| | | 0.10% by weight | 0.20% by weight | cloudy | slightly cloudy | clear |
| 1 | 6 | 130 | 85 | — | 0.10 | 0.20 |
| 2 | 10 | 190 | 105 | — | 0.10 | 0.20 |
| 3 | 10 | 196 | 114 | — | 0.10 | 0.20 |
| 4 | 6 | 148 | 102 | — | 0.10 | 0.20 |
| 5 | 10 | 187 | 103 | — | 0.10 | 0.20 |
| 6 | 6 | 123 | 81 | — | 0.10 | 0.20 |
| 7 | 6 | 133 | 89 | — | 0.10 | 0.20 |
| 8 | 6 | 132 | 86 | — | 0.10 | 0.20 |
| 9 | 10 | 199 | 118 | — | 0.10 | 0.20 |
| 10 | 10 | 201 | 119 | — | 0.10 | 0.20 |
| 11 | 10 | 197 | 115 | — | 0.10 | 0.20 |
| V0 | | 450 | | cloudy | | |
| V1 | 25 | 302 | 227 | 0.10 | 0.20 | — |
| V2 | 25 | 307 | 231 | 0.10 | 0.20 | — |
| V3 | 24 | 296 | 221 | 0.10 | 0.20 | — |
| V4 | 24 | 310 | 242 | 0.10 | 0.20 | — |
| V5 | 35 | 311 | 244 | 0.10 | 0.20 | — |
| V6 | 34 | 305 | 228 | 0.10 | 0.20 | — |

DETERMINATION OF THE RETENTION OF FILLERS

Filler retention is determined from the ash content of paper sheets which have been produced by means of the Rapid-Köthen apparatus according according to Merkblatt V/8/57 of the Verein der Zellstoff- und Papierchemiker und Ingenieure (old version of Merkblatt 108).

The paper sheets used have the following composition:

80% bleached sulphite cellulose 27° SR)
15% China clay
5% titanium dioxide.

The pH of the paper pulp suspension was adjusted to 6.5 with alum. In all the examples, a quantity of retention agent of 0.20% by weight of the solutions entered 3 (based on absolutely dry paper fibers) was added to the fibrous suspension.

The ash contents obtained from the paper sheets are shown in Table 4.

TABLE 4

| Example | Retention of filler Ash content (% by wt.) |
|---|---|
| 1 | 10.8 |
| 2 | 9.9 |
| 3 | 9.6 |
| 4 | 10.2 |
| 5 | 9.8 |
| 6 | 10.4 |
| 7 | 10.5 |
| 8 | 10.6 |
| 9 | 9.5 |
| 10 | 9.4 |
| 11 | 9.6 |
| Comparison example | |
| V0 | 6.1 |
| V1 | 7.5 |
| V2 | 7.6 |
| V3 | 8.1 |
| V4 | 7.4 |
| V5 | 7.5 |
| V6 | 7.9 |

DETERMINATION OF THE DRAINAGE

The characteristic freeness decrease in "Schopper-Riegler Riegler °SR determined in accordance with the method in Instruction Sheet 107 of the Verein der Zellstoff- und Papierchemiker und Ingenieure (Association of Pulp and Paper Chemists and Engineers). In these examples, both the products according to the invention and the comparison products are added, as retention agents, in the form of their aqueous solutions, to a newsprint pulp suspension (concentration according to Table 5). The fiber concentration was 2 g/l. The concentration of the retention agent was 0.1 and 0.3 % by weight relative to absolutely dry paper. The mentioned newsprint pulp suspension was obtained by mechanical defibering of commercially available newsprint, followed by speck-free pulping of the defibrated product in a beater (type Mark 3, Gockel & Co. GmbH, München). The measurement were carried out at a pH value of 6.5 and 4.8 and these values were obtained using a 1 % strength by weight alum / $H_2SO_4$ (weight ratio 1:1) solution.

TABLE 5

| | Determination of drainage Freeness decrease in °SR after addition of retention agent (% by weight) | | | |
|---|---|---|---|---|
| | 0.1 | 0.3 | 0.1 | 0.3 |
| | pH 6.5 | | pH 4.8 | |
| Example | | | | |
| 1 | 34 | 24 | 39 | 28 |
| 2 | 32 | 23 | 33 | 25 |
| 3 | 33 | 23 | 34 | 26 |
| 4 | 36 | 26 | 40 | 30 |
| 5 | 32 | 22 | 32 | 24 |
| 6 | 33 | 23 | 39 | 29 |
| 7 | 35 | 25 | 40 | 31 |
| 8 | 35 | 26 | 41 | 30 |
| 9 | 34 | 25 | 40 | 32 |
| 10 | 34 | 24 | 40 | 31 |
| 11 | 33 | 22 | 39 | 29 |
| Comparison example | | | | |
| V1 | 38 | 28 | 45 | 39 |
| V2 | 38 | 28 | 46 | 40 |
| V3 | 37 | 27 | 42 | 36 |
| V4 | 37 | 27 | 45 | 40 |
| V5 | 38 | 29 | 46 | 41 |
| V6 | 36 | 27 | 47 | 42 |

TABLE 5-continued

| | Determination of drainage Freeness decrease in °SR after addition of retention agent (% by weight) | | | |
|---|---|---|---|---|
| | 0.1 | 0.3 | 0.1 | 0.3 |
| | pH 6.5 | | pH 4.8 | |
| V0 | 59 | | 63 | |

We claim:
1. An agent suitable for the manufacture of paper consisting essentially of an aqueous, homogeneous, storage stable solution of a cationic polyacrylamide (C) and at least one other polymer selected from the group consisting of
(A) 25 to 90% by weight, based on polymer content, of at least one polyamidamine and
(B) 25 to 90% by weight, based on polymer content, of at least one polyamine,
said (C) being 10 to 75% by weight, based on polymer content, of at least one cationic polyacrylamide having recurrent dimethylaminopropylacrylamide units which may be quaternized, wherein the proportion of polymers (A) to (C) is at least 1% by weight, based on the total weight of the agent.
2. An agent according to claim 1, wherein the polyamidamine (A) is obtained by cross-linking with polyfunctional compounds of polycondensation products of polyalkylenepolyamines and aliphatic dicarboxylic acids.
3. An agent according to claim 1, wherein the polyamine is obtained by the reaction of polyalkylene polyamines, which may be quaternized, with compounds which are bifunctional in their reaction with amines.
4. An agent according to claim 1, wherein said polyamidamine (A) is modified with ethyleneimine.
5. An agent according to claim 1, wherein at least one of the polyamidamine (A) and the polyamine (B) is cross-linked with a cross-linking agent.
6. An agent according to claim 1, wherein the proportion of polymers (A) to (C) contained in the agent is 1% to 15% by weight, based on the total weight of the agent.
7. An agent according to claim 1, wherein the solution has a viscosity at 20° C. of from 300 to 10,000 mPa.s and a pH of from 4 to 9.
8. An agent according to claim 1, wherein the cationic polyacrylamide comprises 40 to 98% by weight of acrylamide and 2 to 60% by weight of dialkylaminoalkylacrylamide or its quaternization product.
9. An agent according to claim 2, wherein the polyfunctional compound is selected from the group consisting of polyalkylenepolyamines and aliphatic dicarboxylic acids.
10. An agent according to claim 1, wherein the polyamidamine is contained in an amount of 50 to 90% by weight, based on polymer content.
11. An agent according to claim 1, wherein the polyamine is contained in an amount of 50 to 90% by weight, based on polymer content.
12. An agent according to claim 1, wherein the cationic polyacrylamide is contained in an amount of 10 to 50% by weight, based on polymer content.
13. An agent according to claim 1, wherein the cationic polyacrylamide comprises 70 to 95% by weight of acrylamide and 5 to 30% by weight of dialkylaminoalkylacrylamide or its quaternization product.
14. An agent according to claim 1, wherein the total quantity of (A) to (C) based on the total quantity of the agent amounts to 1 to 25% by weight
15. An agent according to claim 1, wherein the polyamine is free from amide groups.
16. An agent according to claim 5, wherein the cross-linking agent is selected from the group consisting of dihalogenalkyls and halogen alkyl epoxides.

* * * * *

UNITED STATES PATENT AND TRADEMARK OFFICE
CERTIFICATE OF CORRECTION

PATENT NO. : 4,988,790

DATED : January 29, 1991

INVENTOR(S) : Behn et al.

It is certified that error appears in the above-identified patent and that said Letters Patent is hereby corrected as shown below:

Title Page    U.S. PATENT DOCUMENTS: Delete " 4,424,238 " and substitute -- 4,425,238 --

Signed and Sealed this

Twenty-seventh Day of April, 1993

*Attest:*

MICHAEL K. KIRK

*Attesting Officer*      *Acting Commissioner of Patents and Trademarks*